No. 664,854. Patented Jan. 1, 1901.
G. HANSSEN.
FAN APPARATUS.
(Application filed Apr. 5, 1900.)
(No Model.)
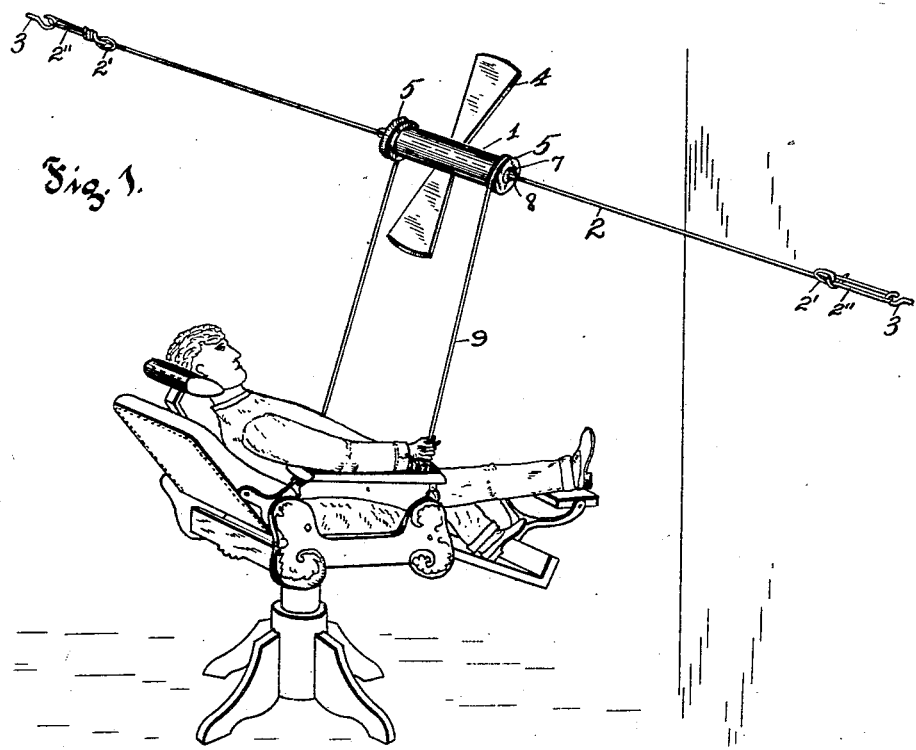
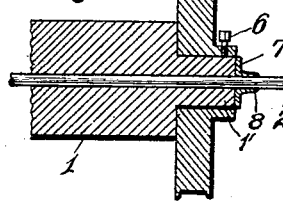
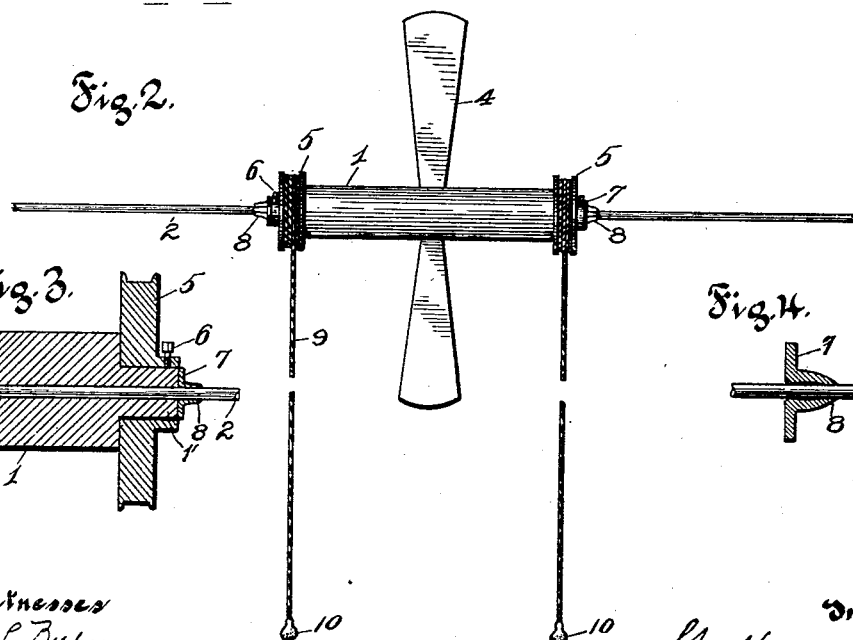
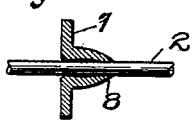
Witnesses
G. L. Bufry
Rosa Ross
Inventor
G. Hanssen
By Emil Starck atty.

UNITED STATES PATENT OFFICE.

GUSTAV HANSSEN, OF ST. LOUIS, MISSOURI.

FAN APPARATUS.

SPECIFICATION forming part of Letters Patent No. 664,854, dated January 1, 1901.

Application filed April 5, 1900. Serial No. 11,742. (No model.)

*To all whom it may concern:*

Be it known that I, GUSTAV HANSSEN, a citizen of the United States, residing at St. Louis, State of Missouri, have invented certain new and useful Improvements in Fan Apparatus, of which the following is a full, clear, and exact description, reference being had to the accompanying drawings, forming a part hereof.

My invention has relation to improvements in fan apparatus; and it consists in the novel arrangement and combination of parts more fully set forth in the specification and pointed out in the claim.

In the drawings, Figure 1 is a perspective view of a barber's chair with a person seated therein, showing the application of my invention. Fig. 2 is an elevation of the fan apparatus. Fig. 3 is an enlarged middle longitudinal sectional detail showing the manner of mounting the spool, and Fig. 4 is a sectional detail of the limiting-disk by which the spool is retained in position along the wire.

The object of my invention is to provide suitable means for fanning and cooling persons in barber-shops while seated in the chair, the fan being adapted to be operated by the person in the chair as often as may be necessary for his convenience and comfort.

In detail the invention may be described as follows:

Referring to the drawings, 1 represents a longitudinally-perforated and preferably cylindrical spool or tube which is slipped over a wire 2, stretched between two walls of a room and connected at its opposite ends to hooks 3, driven into said walls. The wire has formed at each end an eye 2', the free end being subsequently formed into a loop 2'', which is passed over the hook, and by means of a stick or other object passed through said loop the wire is given a few twists and tightened. The periphery of the spool has mounted thereon two or more fan-blades 4, the reduced ends 1' of the spool having passed over them the hubs of the grooved pulleys 5, which are secured to said ends by tightening bolts or screws 6. To retain the spool at any predetermined position along the wire, I pass over the latter the disks 7, which are provided with centrally-disposed outward resilient arms 8, which by their resiliency hug the wire sufficiently to retain the disks frictionally at any point to which the same may be moved. The pulleys have wound over them the cords 9 9, the same being wound relatively in opposite directions, the free ends of the cords being provided with knobs or handles 10, by which they may be seized by the person in the chair, and then by working the hands up and down rotation is imparted to the spool and blades carried by it first in one direction and then the other, so as to produce the desired fanning effect.

It is apparent, of course, that minor changes could be made in the present device without departing from the spirit of my invention. Neither is it limited in its application to barber-shops, as the same could conveniently be mounted over a bed, sofa, reclining-chair, and the like. In the case of a barber-shop one fan could be supplied for each chair in the room, the wire being stretched over the series of chairs with which the shop may be provided.

Having described my invention, what I claim is—

A fan apparatus comprising a wire, a longitudinally-perforated spool passed over the same, a series of blades carried by the spool, terminal grooved pulleys carried by the spool, cords wound over the pulleys in respectively opposite directions, the free ends of the cords being adapted to be alternately drawn upon and motion imparted to the fans first in one direction and then the other, and frictional limiting-disks passed over the wire and movable along the same, for confining the spool to any position along the wire, substantially as set forth.

In testimony whereof I affix my signature in presence of two witnesses.

GUSTAV HANSSEN.

Witnesses:
 EMIL STAREK,
 G. L. BELFRY.